(12) United States Patent
Bonin

(10) Patent No.: US 11,098,588 B2
(45) Date of Patent: *Aug. 24, 2021

(54) CIRCULATING PISTON ENGINE HAVING A ROTARY VALVE ASSEMBLY

(71) Applicant: WB Development Company, LLC, Marlborough, MA (US)

(72) Inventor: Walter T. Bonin, Marlborough, MA (US)

(73) Assignee: WB Development Company LLC, Marlborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,211

(22) Filed: Apr. 15, 2019

(65) Prior Publication Data

US 2019/0242259 A1    Aug. 8, 2019

Related U.S. Application Data

(63) Continuation of application No. 15/079,722, filed on Mar. 24, 2016, now Pat. No. 10,260,346.

(60) Provisional application No. 62/138,067, filed on Mar. 25, 2015.

(51) Int. Cl.
*F01C 20/14* (2006.01)
*F02B 53/06* (2006.01)
*F01C 1/04* (2006.01)

(52) U.S. Cl.
CPC ............... *F01C 20/14* (2013.01); *F01C 1/04* (2013.01); *F02B 53/06* (2013.01); *Y02T 10/12* (2013.01)

(58) Field of Classification Search
CPC ................................ F01C 20/14; F02B 53/06
See application file for complete search history.

(56) References Cited

U.S. PATENT DOCUMENTS

| 1,352,237 | A | * | 9/1920 | Andrews | F04C 3/02 |
| | | | | | 418/195 |
| 2,273,625 | A | * | 2/1942 | Concannon | F02B 53/00 |
| | | | | | 123/235 |
| 3,205,874 | A | * | 9/1965 | Renshaw | F02B 53/00 |
| | | | | | 418/195 |
| 3,897,756 | A | * | 8/1975 | Upchurch | F02B 53/08 |
| | | | | | 123/238 |
| 4,451,214 | A | * | 5/1984 | Kagamiyama | F01C 1/46 |
| | | | | | 418/11 |
| 7,059,294 | B2 | * | 6/2006 | Wright | F01C 3/02 |
| | | | | | 123/206 |

(Continued)

*Primary Examiner* — Mary Davis
(74) *Attorney, Agent, or Firm* — Duquettte Law Group LLC

(57) ABSTRACT

An engine includes a housing defining an annular bore and a piston assembly disposed within the annular bore. The engine also includes a rotary valve comprising a circular faceplate and a wall structure disposed at an outer periphery of the faceplate, a portion of the at least one rotary valve disposed within the annular bore, and a rotary drive mechanism connected to the rotary valve and configured to rotate the rotary valve between a first position to align an opening of the wall structure with the annular bore to allow the piston of the piston assembly to travel within the annular bore from a first location relative to the rotary valve to a second location relative to the rotary valve and a second position to define a chamber relative to the piston of the piston assembly at the second location.

12 Claims, 17 Drawing Sheets

(56) References Cited

U.S. PATENT DOCUMENTS

| | | | | |
|---|---|---|---|---|
| 7,703,433 B2* | 4/2010 | Webster | ............... | F02B 53/00 |
| | | | | 123/221 |
| 10,260,346 B2* | 4/2019 | Bonin | ................ | F02B 53/06 |

* cited by examiner

CIRCULATING PISTON ENGINE HAVING A ROTARY VALVE ASSEMBLY

RELATED APPLICATIONS

This patent application is a continuation of U.S. Utility application Ser. No. 15/079,722, filed on Mar. 24, 2016, entitled "Circulating Piston Engine Having a Rotary Valve Assembly" which claims the benefit of U.S. Provisional Application No. 62/138,067, filed on Mar. 25, 2015, entitled "Assemblies for a Circulating Piston Engine," the contents and teachings of which are hereby incorporated by reference in their entirety.

BACKGROUND

Conventional internal combustion piston engines include multiple cylinder assemblies used to drive a crankshaft. In order to drive the crankshaft, each cylinder assembly requires fuel, such as provided by a fuel pump via a fuel injector. During operation, a spark plug of each cylinder assembly ignites a fuel/air mixture received from the fuel injector and causes the mixture to expand. Expansion of the ignited mixture displaces a piston of the cylinder assembly within a cylinder assembly housing to rotate the crankshaft.

Rotary engines have been conceived as a potential replacement for conventional piston engines. For example, rotary engines have been described in the art which include an engine housing having a circular bore, one or more valves moveable mounted within the bore, and a set piston rotatably disposed within the bore and connected to a driveshaft. During operation, as the driveshaft rotates, each valve is caused to open momentarily to permit a piston to pass the valve location in the engine housing. Once the piston rotates past the valve location, the valve closes to define a combustion chamber between the valve and a piston. A fuel injector injects a fuel-air mixture into the combustion chamber and is ignited via a spark plug. The pressure in the chamber caused by combustion of the fuel rotates the piston forward within the bore which, in turn, rotates the driveshaft.

SUMMARY

Conventional internal combustion piston engines suffer from a variety of deficiencies. For example, it has long been recognized that the overall operating efficiency of piston engines is relatively low. The relative inefficiency of piston engines leads to high fuel consumption and emissions which pollute the environment. Despite their recognized deficiencies, piston engine designs are still dominant in the world today.

One rotary engine, the Wankel engine, enjoyed some success relative to conventional piston engines but ultimately failed in the marketplace. The Wankel engine utilized an eccentric rotary design, which differed in design from the rotary engines described above.

Rotary engines as described above, with their promise of high efficiency and power, have never mounted a serious challenge to conventional piston engines. They too have shortcomings which have prevented them from succeeding in the marketplace. Some of those challenges are described below.

For example, as provided above with respect to rotary engines, after a piston rotates past a valve location, the valve closes to define a combustion chamber, a fuel injector injects a fuel-air mixture into the combustion chamber, and a spark plug ignites the mixture. While rotary engine designs utilize moving valve that creates a temporary combustion chamber, these designs do not address the issue of piston runaway which occurs when the piston outruns a portion of the combustion gases. For example, during operation, the piston must rotate past the valve within the bore before the valve can begin to close. During the time it takes for the valve to completely close, the piston continues to advance within the bore, thereby continuously enlarging the combustion chamber and requiring relatively rapid fuel input and high burn rates. To avoid piston runaway, the peak combustion must occur as close to the piston as possible.

Additionally, conventional rotary engine designs do not address the issue of fueling and combustion. In order to limit the amount of energy lost to exhaust to no more than 25% during a combustion event, valve actuation, fuel and air input, and peak ignition pressure must occur in approximately ¼ of the distance to an exhaust port of the engine. However, with conventional rotary engine designs, valve operation can take up to 80% of the time available for a combustion event, which leaves relatively little time for fueling and ignition. Accordingly, relatively high pressures are required to introduce the fuel-air mixture into the combustion chamber in a relatively short amount of time (e.g., under one millisecond).

For example, assume a rotary engine defines an 18.85 inch stroke length. For a piston travelling within the bore at 600 revolutions per minute (RPM), the piston travels at a rate of 0.75 inches/millisecond (ms). Further assume that the peak pressure within the bore is 1000 psi at full ignition (i.e., at a combustion event). For an exhaust port located sixteen inches away from combustion, the pressure at the exhaust port must be no greater than 250 psi to limit the amount of energy lost to exhaust to no more than 25%. Since pressure decreases by half as the distance from the combustion event doubles, the pressure at a location eight inches from the exhaust port is about 500 psi and the pressure at a location four inches from the exhaust port is about 1000 psi. This dictates that the valve operation, fueling, and combustion must occur in when the piston is located at a distance within four inches from the valve.

With the piston travelling at a velocity of 0.75 inches/ms, the piston can travel a distance of four inches in approximately 5 ms. Further, as operation of the valve can require 80% of the time available for a combustion event, it can take the valve 4 ms to move from a fully open to a fully closed position (i.e., three inches of travel distance of the piston). This can leaves approximately 1.5 ms (i.e., one inch of travel distance of the piston) for fueling and combustion. Accordingly, a pressure of approximately 176 psi or greater is required to provide the fuel-air mixture to the combustion chamber in ½ ms. Conventional fuel injectors do not have this capability as they typically require 10 ms or more to fire.

By contrast to conventional piston engines and rotary engine designs, embodiments of the present innovation relate to a circulating piston engine having a rotary valve assembly. For example, the rotary valve assembly can include a set of rotary valves, each rotary valve defining a substantially circular or loop-shaped wall structure and each rotary valve defining a slot or an opening that is selectively aligned with the engine bore. During operation, the rotary valve rotates about an axis of rotation that is substantially perpendicular to the axis of rotation of a piston in the engine. With such rotation, when the opening of the rotary valve is aligned with the engine bore, the piston can travel within the engine bore past the rotary valve. When the wall structure of the rotary valve is aligned with the engine bore, the rotary valve defines a combustion chamber with the piston. Based upon this configuration, the rotary valve can operate with a relatively high speed (e.g., the rotary valve can open and close at a rate of about once every 0.88 ms). Accordingly, this relatively rapid combustion chamber creation reduces the size of the combustion chamber when peak pressure occurs which addresses the issue of piston runaway and which, in turn, increases the operating efficiency of the engine.

In one arrangement, the circulating piston engine also defines at least one compression channel configured to generate relatively high pressure compressed air separate from the combustion channel. The circulating piston engine maintains the compressed air within a pressurized air reservoir at a pressure of about 176 psi which, in turn, delivers the relatively high pressure air to a fuel injector. With such pressurization, the fuel injector can provide the fuel-air mixture to the combustion chamber in ½ ms.

In one arrangement, embodiments of the innovation relate to an engine that includes a housing defining an annular bore and a piston assembly disposed within the annular bore. The engine also includes a rotary valve comprising a circular faceplate and a wall structure disposed at an outer periphery of the faceplate, a portion of the at least one rotary valve disposed within the annular bore, and a rotary drive mechanism connected to the rotary valve and configured to rotate the rotary valve between a first position to align an opening of the wall structure with the annular bore to allow the piston of the piston assembly to travel within the annular bore from a first location relative to the rotary valve to a second location relative to the rotary valve and a second position to define a chamber relative to the piston of the piston assembly at the second location.

In one arrangement, embodiments of the innovation relate to a circulating piston engine that includes a housing defining an annular bore extending about its outer periphery and a set of pistons disposed within the bore and secured to a drive mechanism or driveshaft. The engine also includes a set of valves that are rotatably disposed within the bore, each valve being configured to define a temporary combustion chamber relative to a corresponding piston.

BRIEF DESCRIPTION OF THE DRAWINGS

The foregoing and other objects, features and advantages will be apparent from the following description of particular embodiments of the innovation, as illustrated in the accompanying drawings in which like reference characters refer to the same parts throughout the different views. The drawings are not necessarily to scale, emphasis instead being placed upon illustrating the principles of various embodiments of the innovation.

DETAILED DESCRIPTION

Figure 1A:
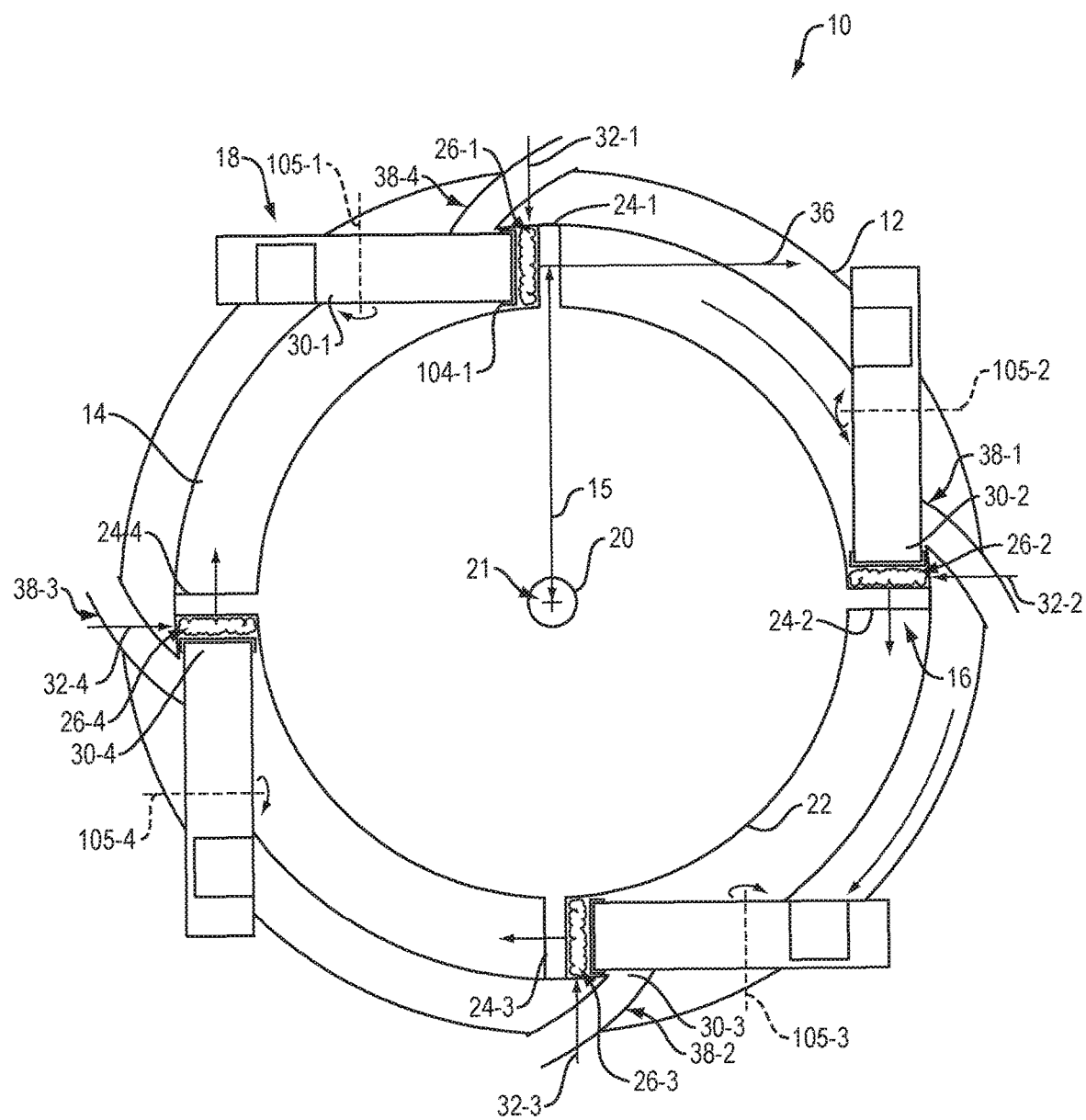
FIG. 1A illustrates a top sectional, schematic view of a circulating piston engine having a rotary valve assembly, according to one arrangement.

Embodiments of the innovation relate to a circulating piston engine having a rotary valve assembly. For example, the rotary valve assembly can include a set of rotary valves, each rotary valve defining a substantially circular or loop-shaped wall structure and each rotary valve defining a slot or an opening that is selectively aligned with the engine bore. During operation, the rotary valve rotates about an axis of rotation that is substantially perpendicular to the axis of rotation of a piston in the engine. With such rotation, when the opening of the rotary valve is aligned with the engine bore, the piston can travel within the engine bore past the rotary valve. When the wall structure of the rotary valve is aligned with the engine bore, the rotary valve defines a combustion chamber with the piston. Based upon this configuration, the rotary valve can operate with a relatively high speed (e.g., the rotating valve can open and close at a rate of about once every 0.88 ms). Accordingly, this relatively rapid combustion chamber creation reduces the size of the combustion chamber when peak pressure occurs which addresses the issue of piston runaway and which, in turn, increases the operating efficiency of the engine FIG. 1A illustrates an overhead, cross-sectional, schematic view of a circulating piston engine 10, according to one arrangement. The engine 10 includes a housing 12 that defines an annular channel or bore 14 and that contains a piston assembly 16 and a rotary valve assembly 18.

The annular bore 14 is disposed at an outer periphery of the housing 12. While the annular bore 14 can be configured in a variety of sizes, in one arrangement, the annular bore 14 is configured as having a radius 15 of about twelve inches relative to an axis of rotation 21 of the piston assembly 16. As will be described below, with such a configuration, the relatively large radius 15 of the annular bore 14 disposes an engine combustion chamber, described in detail below, at a maximal distance from the axis of rotation 21 and allows the piston assembly 16 to generate a relatively large torque on an associated drive mechanism 20, such as a drive shaft, disposed at the axis of rotation.

The annular bore 14 can be configured with a cross-sectional area having a variety of shapes. In one arrangement, with reference to FIG. 2B, in the case where a piston 24-1 of the piston assembly 16 defines a generally rectangular cross-sectional area 25, the annular bore 14 can also define a corresponding rectangular cross-sectional area 27. In one arrangement, the rectangular cross-sectional area of the annular bore 14 can include a width to height ratio of about 1:2.8 to correspond with the size of the piston 24 moving within the bore 14. For example, with reference to FIGS. 2A and 2B, the annular bore 14 defines a height 120 of about 1 inch and a width 122 of about 2.8 inches which allows the shortest transit time for the valve 24-1 within the bore 14. The valve 24-1 can also define a height 124 of about 1 inch and a width 126 of about 2.8 inches to minimize or prevent combustion gases from leaking forward of the travel direction of the piston 24-1. It is noted that the height 124 and width 126 of the piston 24-1 is configured as defining a clearance distance (i.e., space) with the corresponding height 120 and width 122 of the bore 14 to allow for travel of the piston 24-1 within the bore 14.

Returning to FIG. 1A, in the arrangement illustrated, the piston assembly 16 is disposed within the annular bore 14 and is coupled to the drive mechanism 20 via a flywheel 22. While the piston assembly 16 can include any number of individual pistons 24, in the arrangement illustrated, the piston assembly 16 includes four pistons 24-1 through 24-4 disposed about the periphery of the flywheel 22. In one arrangement, such as in the case where the fuel injectors 32 fire in a substantially simultaneous manner, opposing pistons are disposed at an angular orientation of about 180° relative to each other and adjacent pistons are disposed at an angular orientation of about 90° relative to each other. For example, as illustrated, the opposing first and third pistons 24-1, 24-3 are disposed on the flywheel 22 at about 180° relative to each other and the opposing second and fourth pistons 24-2, 24-4 are disposed on the flywheel 22 at about 180° relative to each other. Additionally, the adjacent first and second pistons 24-1, 24-2 are disposed on the flywheel 22 at a relative angular orientation of about 90°, the adjacent second and third pistons 24-2, 24-3 are disposed on the flywheel 22 at a relative angular orientation of about 90°, the adjacent third and fourth pistons 24-3, 24-4 are disposed on the flywheel 22 at a relative angular orientation of about 90°, and the adjacent fourth and first pistons 24-4, 24-1 are disposed on the flywheel 22 at a relative angular orientation of about 90°.

During operation, the pistons 24 of the piston assembly 16 are configured to rotate within the annular bore 14. For example, as illustrated the pistons 24 are configured to rotate within the annular bore 14 in a clockwise direction. However, it should be noted that the pistons 24 can rotate within the annular bore 14 in a counterclockwise manner as well. Such rotation causes rotation of the drive mechanism 20.

The rotary valve assembly 18 includes a set of rotary valves 30, each configured to define a combustion chamber 26 relative to the respective pistons 24 of the piston assembly 16. For example, while the rotary valve assembly 18 can include any number of individual rotary valves 30, in the arrangement illustrated, the rotary valve assembly 18 includes rotary valves 30-1 through 30-4 at least partially disposed within the annular bore 14 of the housing 12. While the rotary valves 30 can be disposed at a variety of locations about the periphery of the housing 12, in one arrangement, opposing valves are disposed at an angular orientation of about 180° relative to each other and adjacent valves disposed at an angular orientation of about 90° relative to each other. For example, as illustrated, the first and third rotary valves 30-1, 30-3 are disposed about the periphery of the housing 12 at about 180° relative to each other and the second and fourth rotary valves 30-2, 30-4 are disposed about the periphery of the housing 12 at about 180° relative to each other. Additionally, the first and second rotary valves 30-1, 30-2 are disposed about the periphery of the housing 12 at a relative angular orientation of about 90°, the second and third rotary valves 30-2, 30-3 are disposed about the periphery of the housing 12 at a relative angular orientation of about 90°, the third and fourth rotary valves 30-3, 30-4 are disposed about the periphery of the housing 12 at a relative angular orientation of about 90°, and the fourth and first rotary valves 30-4, 30-1 are disposed about the periphery of the housing 12 at a relative angular orientation of about 90°. In such an arrangement, the relative positioning of the rotary valves 30 of the rotary valve assembly 18 corresponds to the relative positioning of the pistons 24 about the flywheel 22 of the piston assembly 16.

With continued reference to FIG. 1A, each of the pistons 24 travels within the bore 14 along a relatively large stroke distance, such as a distance of between about 16 inches and 20 inches, toward the next rotary valve 30. At a certain point in the bore 14, such as at the end of a stroke length 13 as illustrated in FIG. 1A, each piston 24 passes a corresponding exhaust port 38 (i.e., disposed proximal to the subsequent rotary valve 30) which vents the spent gas contained in the chamber 26 to the atmosphere. For example, as piston 24-1 passes the exhaust port 38-1, spent gas contained in the chamber 26-1 between the piston 24-1 and the rotary valve 30-1 can exit the chamber 26-1 via the exhaust port 38-1.

In use, the pistons 24 and rotary valve assembly 18 are disposed at the outer perimeter of the engine housing 12, such as at distance of about twelve inches from the drive mechanism 20. With the combustion force applied to the pistons 24 along a direction that is tangent to the direction of rotation and perpendicular to the distance 15 from the drive mechanism 20, such combustion force can maximize torque on the drive mechanism 20. Additionally, the relatively long stroke path of the pistons 24, the presence of the exhaust ports 38, and the ability of the engine 10 to customize the number of combustion events generated in the bore 14 can enhance the performance of the engine 10. For example, the engine 10 can produce a relatively large amount of continuous power (e.g., a horsepower of about 685 @800 RPM) with a relatively high torque (e.g., an average torque of about 4500 ft-lbs) and efficiency (e.g., an efficiency of about 60%) relative to conventional engines having an efficiency of about 25-30%.

Figure 1B:
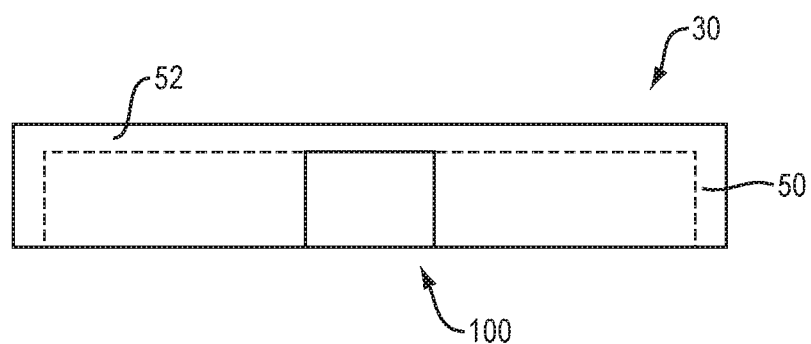
FIG. 1B illustrates a side schematic view of a rotary valve, according to one arrangement.
Figure 1C:
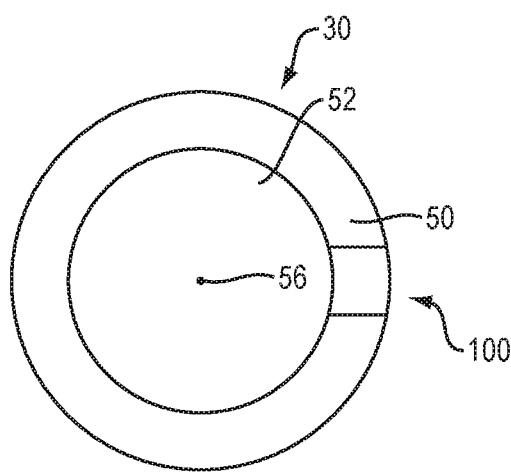
FIG. 1C illustrates a bottom schematic view of the rotary valve of FIG. 1B, according to one arrangement.
Figure 1D:
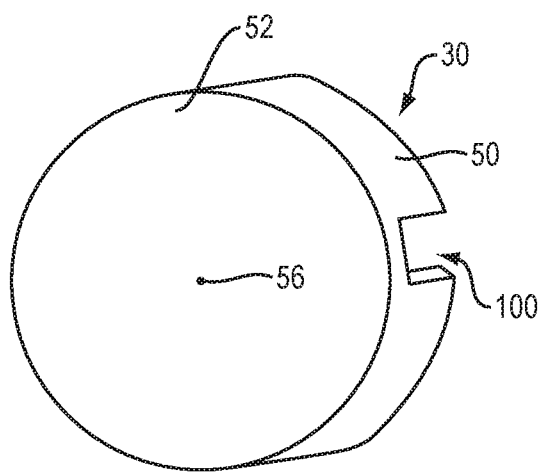
FIG. 1D illustrates a top perspective schematic view of the rotary valve of FIG. 1B, according to one arrangement.

In the arrangement illustrated in FIGS. 1A through 1D, each rotary valve 30 of the rotary valve assembly 18 is manufactured as a substantially circular, cup-shaped structure. For example, as indicated in FIGS. 1B through 1D, the rotary valve 30 includes loop-shaped wall structure 50 and a face plate 52. The loop-shaped wall structure 50 of the rotary valve 30 defines an opening or slot 100 configured to allow each of the pistons 24 to rotate within the annular bore 14 when the slot 100 is aligned with a piston 24 travelling in the annular bore 14, as will be described in detail below.

While each rotary valve 30 can be manufactured from a variety of materials, in one arrangement, the rotary valves 30 are manufactured from one or more materials capable of withstanding combustion temperatures in excess of about 4000° F. and pressures of about 1000 pounds per square inch (psi) while rotating relative to the housing 12.

Figure 1E:
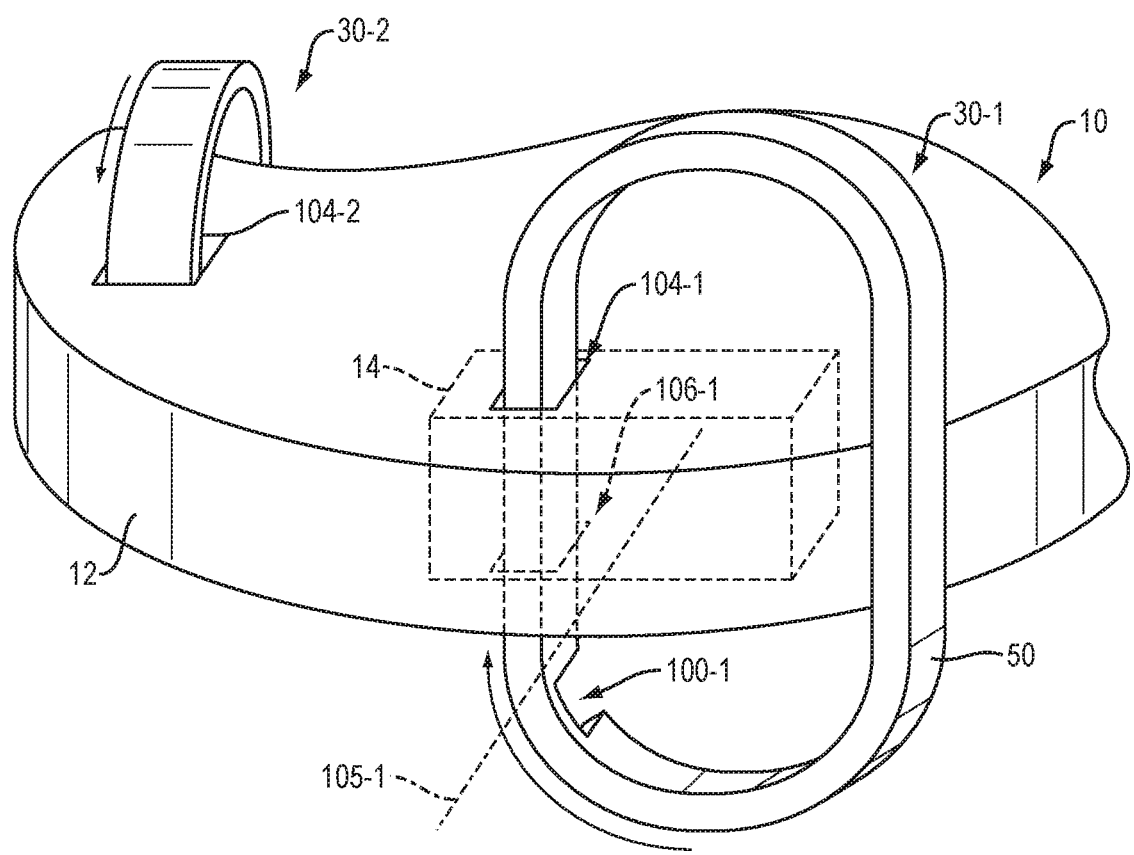
FIG. 1E illustrates a partial perspective view of a schematic representation of the rotary valves and circulating piston engine of FIG. 1A, according to one arrangement.

In one arrangement, each rotary valve 30 is configured to rotate about an axis of rotation 56 that is substantially perpendicular to the axis of rotation 21 of the pistons 24. Rotation of each rotary valve 30 relative to the housing 12 and the annular bore 14 creates a temporary combustion chamber 26 relative to a corresponding piston 24. For example, as indicated in FIGS. 1A and 1E, the housing 12 defines opposing openings 104, 106 relative to the annular bore 14 through which the rotary valves 30 extend. FIG. 1E is a schematic depiction of the first rotary valve 30-1 with the face plate 52 removed for ease of understanding. Specifically, with reference to the first rotary valve 30-1 of FIG. 1E, the housing 12 defines a first opening 104-1 through a first or upper surface and an opposing second opening 106-1 through a second or lower surface. The first rotary valve 30-1 extends though the first opening 104-1, into the annular bore 14, and through the second opening 106-1. With such a configuration, a portion of each rotary valve 30 is rotatably disposed within the annular bore 14 during operation of the engine 10.

In one arrangement, each of the openings 104, 106 includes a sealing element (not shown) which forms a seal with the corresponding rotary valve 30. Each sealing element maintains a substantially fluid-resistant seal with the corresponding rotary valve 30 during operation. This, in turn, allows each rotary valve 30 to define a combustion chamber 26 relative to a corresponding piston 24 that maximizes the combustion force generated on the piston 24 during a combustion event.

Each rotary valve 30 is configured to rotate about an axis of rotation 105 that is substantially perpendicular to the axis of rotation 21 of the flywheel 22 and pistons 24 of the piston assembly 16. Taking the first rotary valve 30-1 as an example, the first rotary valve 30-1 is configured to rotate about an axis of rotation 105-1. While FIGS. 1A and 1E indicate that each rotary valve 30 is configured to rotate clockwise about its corresponding axis of rotation 105, such illustration is by way of example only. In one arrangement, each rotary valve 30 can be configured to rotate counterclockwise relative to its corresponding axis of rotation 105. Alternately, certain rotary valves 30 can be configured to rotate clockwise about their corresponding axes of rotation 105 and other rotary valves 30 can be configured to rotate counterclockwise about their corresponding axes of rotation 105.

Figure 1F:
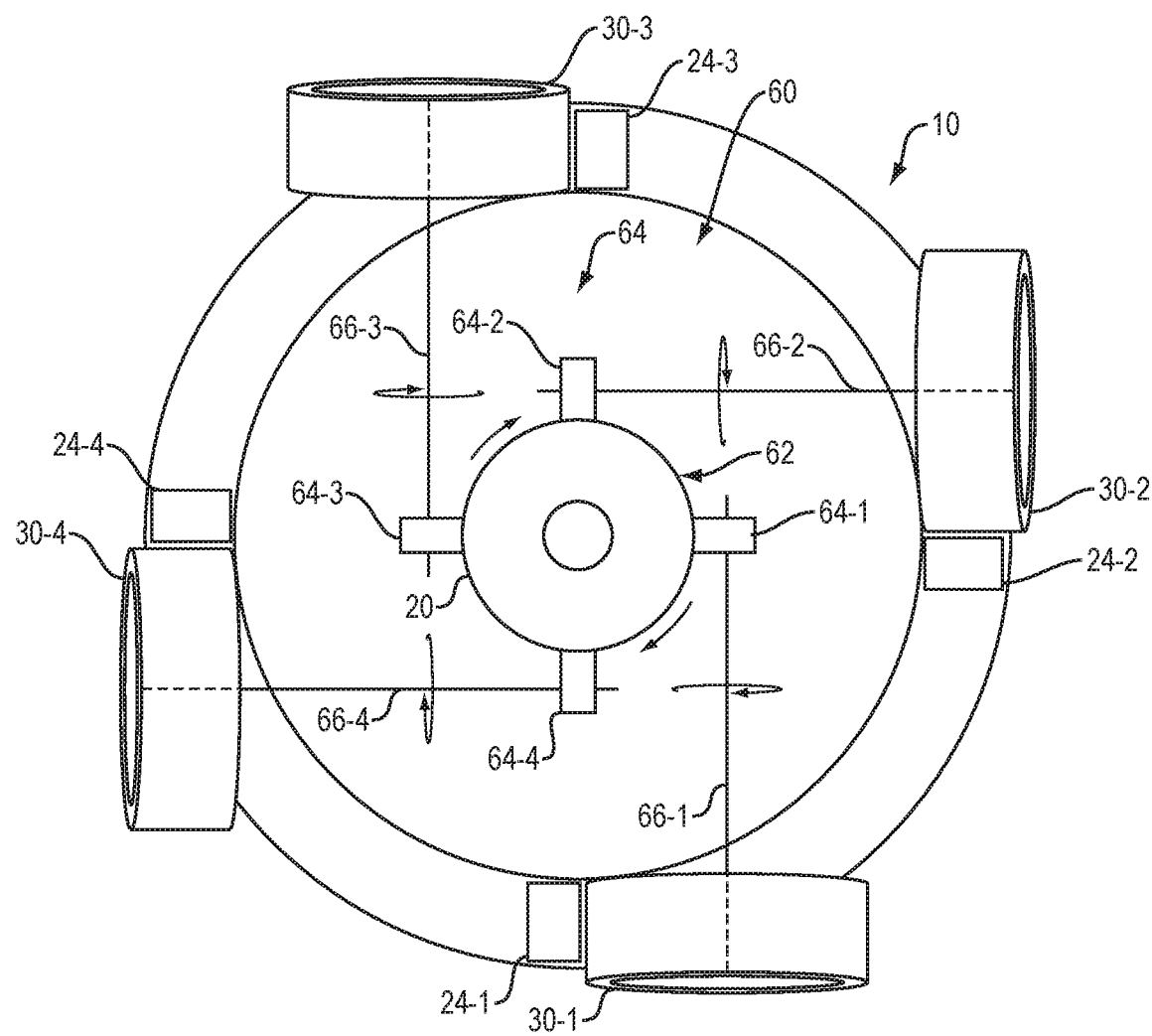
FIG. 1F illustrates a bottom sectional schematic view of a rotary drive mechanism of the rotary valve assembly of FIG. 1A.
Figure 1G:
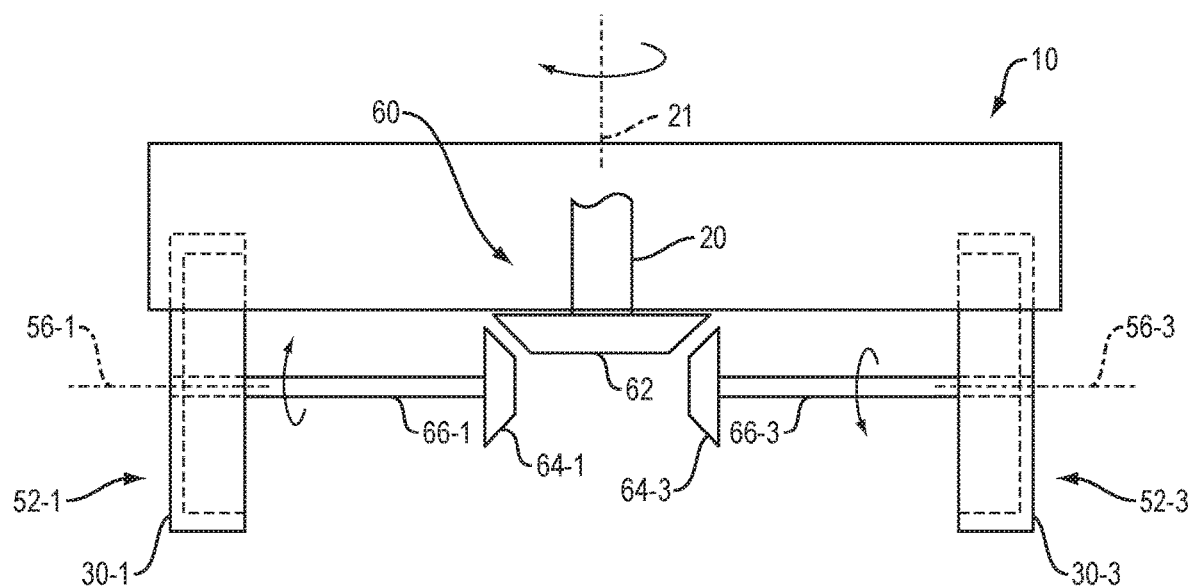
FIG. 1G illustrates a side schematic view of the rotary drive mechanism of FIG. 1F, according to one arrangement.

A variety of types of rotary drive mechanisms can be utilized to rotate each rotary valve 30 within the annular bore 14. For example, FIGS. 1F and 1G illustrate, respectively, a bottom sectional and side schematic view of a rotary drive mechanism 60 of the rotary valve assembly 18. The rotary drive mechanism 60 can include a drive gear 62 connected to the drive mechanism 20. The rotary drive mechanism 60 can also include a set of rotary valve gears 64 disposed in operative communication with the drive gear 62 and with the rotary valves 30. For example, the set of rotary valve gears 64 can include first, second, third, and fourth rotary valve gears 66-1, 66-2, 66-3, and 66-4, respectively, mesh with the rotary drive mechanism 60. While the drive gear 62 and the set of rotary valve gears 64 can be configured in a variety of ways, in one arrangement, the drive gear 62 and each of the rotary valve gears 64 are configured as bevel gears.

Each of the rotary valve gears 64-1 through 64-4 are also connected to corresponding first, second, third, and fourth rotary valves 30-1, 30-2, 30-3, and 30-4, via respective shafts 66-1, 66-2, 66-3, and 66-4. For example, each shaft 66 extends into the loop-shaped wall structure 50 of a corresponding rotary valve 30 and connects to that rotary valve's face plate 52 such that a longitudinal axis of the shaft is substantially collinear with the axis of rotation 56 of the rotary valve 30.

With such a configuration, as the flywheel 22 rotates in use, the associated drive mechanism 20 and drive gear 62 also rotate. This causes the drive gear 62 to rotate each of the corresponding rotary valve gears 64, shafts 666, and rotary valves 30. For example, rotation of the drive mechanism 20 and drive gear 62 in a clockwise direction about the axis of rotation 21 causes the rotary valve gears 66-1 through 66-4, shafts 66-1 through 66-4, and rotary valves 30-1 through 30-4 to rotate about their respective axes of rotation 52-1 through 52-4.

Each rotary valve 30 operates in conjunction with each rotating combustion piston 24. For example, as illustrated in FIG. 1A, with four rotating combustion pistons 24, the engine 10 includes four substantially equidistant rotary valves 30. Therefore, each rotary valve 30 is configured to rotate four times about its respective axis of rotation 105 for every single rotation of the flywheel 22. Assuming a sixteen inch stroke, such a configuration can result in a rotational valve velocity of between about 1.6 inches/millisecond and 1.8 inches/milliseconds, such as a velocity of about 1.7 inches/millisecond. Also, for a combustion channel having a cross-sectional area of one square inch, such a configuration can result in a valve crossing time (i.e., the amount of time it takes a piston 24 to travel from a first valve location to an adjacent second valve location) of between about 0.5 and 0.7 milliseconds, such as a crossing time of about 0.6 milliseconds.

Since fuel cannot enter and ignite within the combustion chamber 26 until the combustion chamber 26 is sealed, the faster the chamber formation (e.g., once about every 0.6 milliseconds) the more efficient the process. Further, a pressure volume of 1000 psi that is two inches in length in a 16 inch channel 14 will exhaust at less than 125 psi, which is 12.5% exhaust loss, owing to the fact that pressure decreases 50% for every doubling of volume. This configuration results in an engine approaching at least 60% efficiency. The pressure in the channel 14 will halve at 4, 8 and 16 inches of travel. A slower valve producing a four inch pressure volume will double one less time at 8 and 16 inches exhausting at 250 psi for an exhaust loss of 25%.

In use, the rotary drive mechanism 60 is configured to rotate each rotary valve 30 to a first position to align the opening 100 of the loop-shaped wall structure 50 with the annular bore 14. The rotation of each rotary valve 30 is timed to allow each rotary valve 30 to form a bulkhead with a piston 24 for the majority of a piston rotation cycle and to define a combustion chamber relative to the piston 24 at the second location. The rotation of the rotary valve 30 is also timed such that each slot 100 defined by each rotary valve 30 is temporarily aligned with the annular bore 14 to allow a piston 24 to travel within the annular bore 14 from a first location proximate to the rotary valve 30 to a second location distal to the rotary valve 30.

For example, during operation, the rotary drive mechanism 60 rotates each piston 24 of the piston assembly 16 within the annular bore 14 and toward a valve 30 of the rotary valve assembly 18. Taking piston 24-1 and rotary valve 30-1 as an example, and with reference to FIG. 2A, as the piston 24-1 transitions within the annular bore 14 from a distal position to a proximal position relative to the corresponding rotary valve 30-1, the rotary valve 30-1 is disposed in a first position 109 relative to the annular bore 14. As the rotary valve 30-1 rotates to a first position, a longitudinal axis 106 of the channel 100-1 of the rotary valve 30-1 becomes substantially aligned with a longitudinal axis 108 of the annular bore 14 to allow the piston 24-1 to advance along its travel path from a first position 110 to a second position 112. It is noted that the channel 100-1 of the valve 30-1 defines a width 129 that is larger than the width 124 of the piston. This configuration allows the piston 24-1 to clear the valve 30-1 before the valve 30-1 begins to block the bore 14 and form a bulkhead relative to the piston 24-1.

Figure 2A:
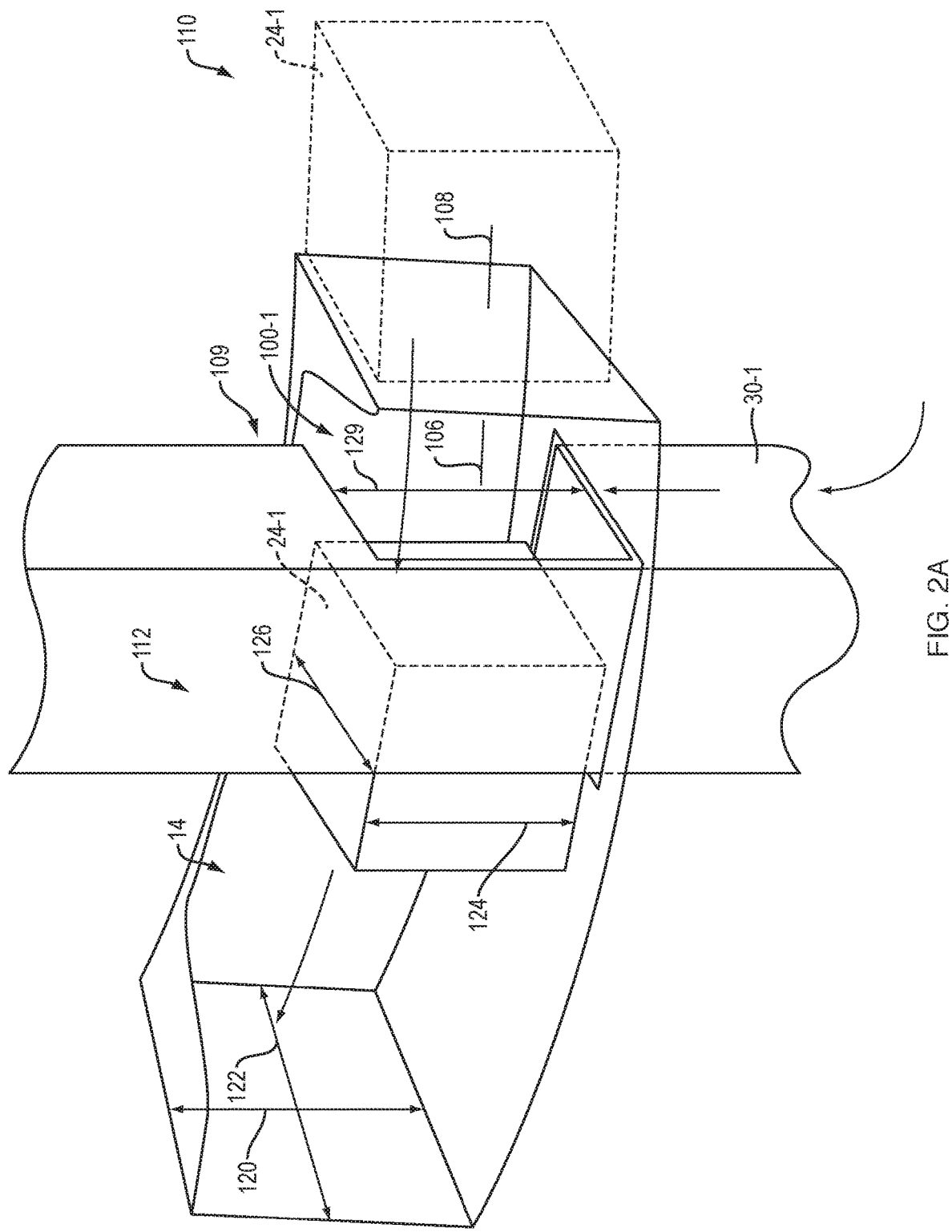
FIG. 2A illustrates a partial sectional, schematic view of a portion of an annular bore of the circulating piston engine of FIG. 1A, according to one arrangement.
Figure 2B:
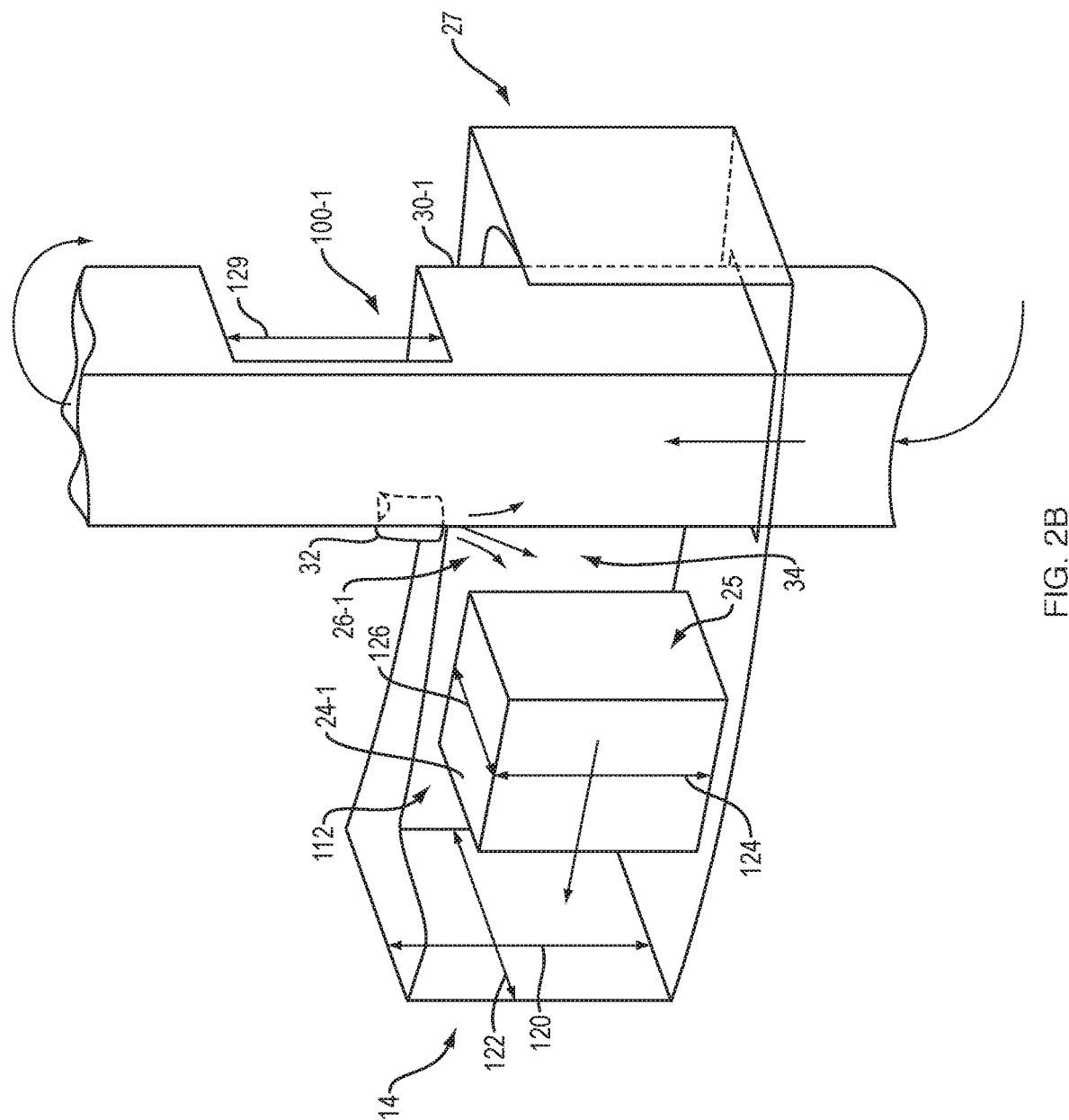
FIG. 2B illustrates a partial sectional, schematic view of a portion of the annular bore of FIG. 2A, according to one arrangement.

With reference to FIG. 2B, as the piston 24-1 reaches the second position 112 within the annular bore 14, the rotary drive mechanism 60 continues to rotate the rotary valve 30-1 to a second position relative to the annular bore 14 (e.g., to a closed position), such as illustrated. With such positioning, the rotary valve 30-1 defines the combustion chamber 26-1 relative to the piston 24-1 and is configured as a bulkhead against which combustion can work to produce power.

For example, with the rotary valve 30-1 disposed in a closed position as indicated in FIG. 2B, a fuel injector 32 then delivers a fuel-air mixture 34 into the associated combustion chamber 26-1 which can then be ignited by an ignition device (not shown) such as a spark plug. As the ignition devices ignite the fuel-air mixture 34 in the combustion chamber 26-1, the expansion of the fuel-air mixture 34 against the rotary valve 30-1 generates a force on the piston 24-1 to propel the piston 24-1 along the rotational travel path defined by the annular bore 14.

Additionally, as each piston 24 approaches the subsequently disposed rotary valve 30, each rotary valve 30 moves from the second, closed position (FIG. 2B) to the first, open position (FIG. 2A) relative to a corresponding piston 24. For example, with reference to FIG. 2B, as the piston 24-1 translates away from the rotary valve 30-1 and approaches rotary valve 30-2, the valve 30-2 rotates to the open position where the channel 100-1 of the rotary valve 30-1 becomes substantially aligned with a longitudinal axis 108 of the annular bore 14. Such positioning allows the piston 24-1 to move past the rotary valve 30-2. Once the piston 24 has translated to a location distal to the rotary valve 30-2, the rotary valve 30-2 rotates to a closed position and the combustion process begins again.

The use of the rotary valves 30 in the engine 10 allows the annular bore 14 to become opened, to allow passage of a piston 24 there through, and closed, to create a combustion chamber, at a relatively high rate of speed (e.g., the rotary valve can open and close at a rate of about once every 0.88 ms). Accordingly, the relatively rapid combustion chamber creation reduces the size of the combustion chamber when peak pressure occurs. This, in turn, minimizes piston runaway and increases the operating efficiency of the engine.

With reference to FIG. 1A, during operation, the engine 10 can generate up to sixteen combustion events per revolution (i.e., each of four pistons 24 experiencing up to four combustion events in a single revolution), thereby causing the piston assembly 16 to rotate the drive mechanism 20.

In one arrangement, the engine 10 can be configured as a double stroke engine where two of the four pistons 24 (e.g., piston 24-1 and 24-3) experience two combustion events in a single revolution. With such a configuration, to extend the drive provided on the pistons 24 by the pressurized combustion gas within the annular bore 14, the engine 10 is configured with a set of bypass assemblies 190, described in detail below.

Figure 3A:
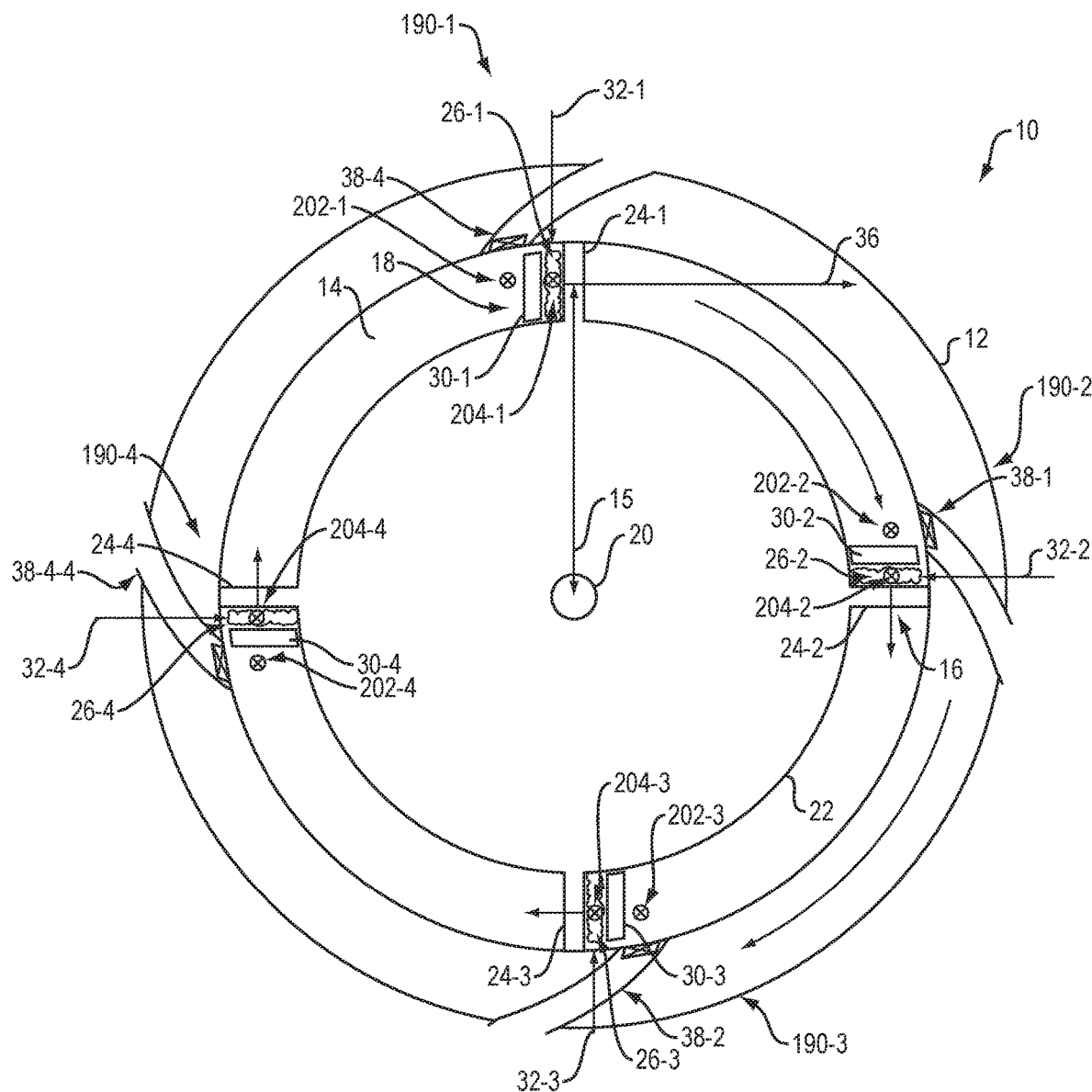
FIG. 3A illustrates a sectional, schematic view of a circulating piston engine having a set of bypass valves, according to one arrangement.
Figure 3B:
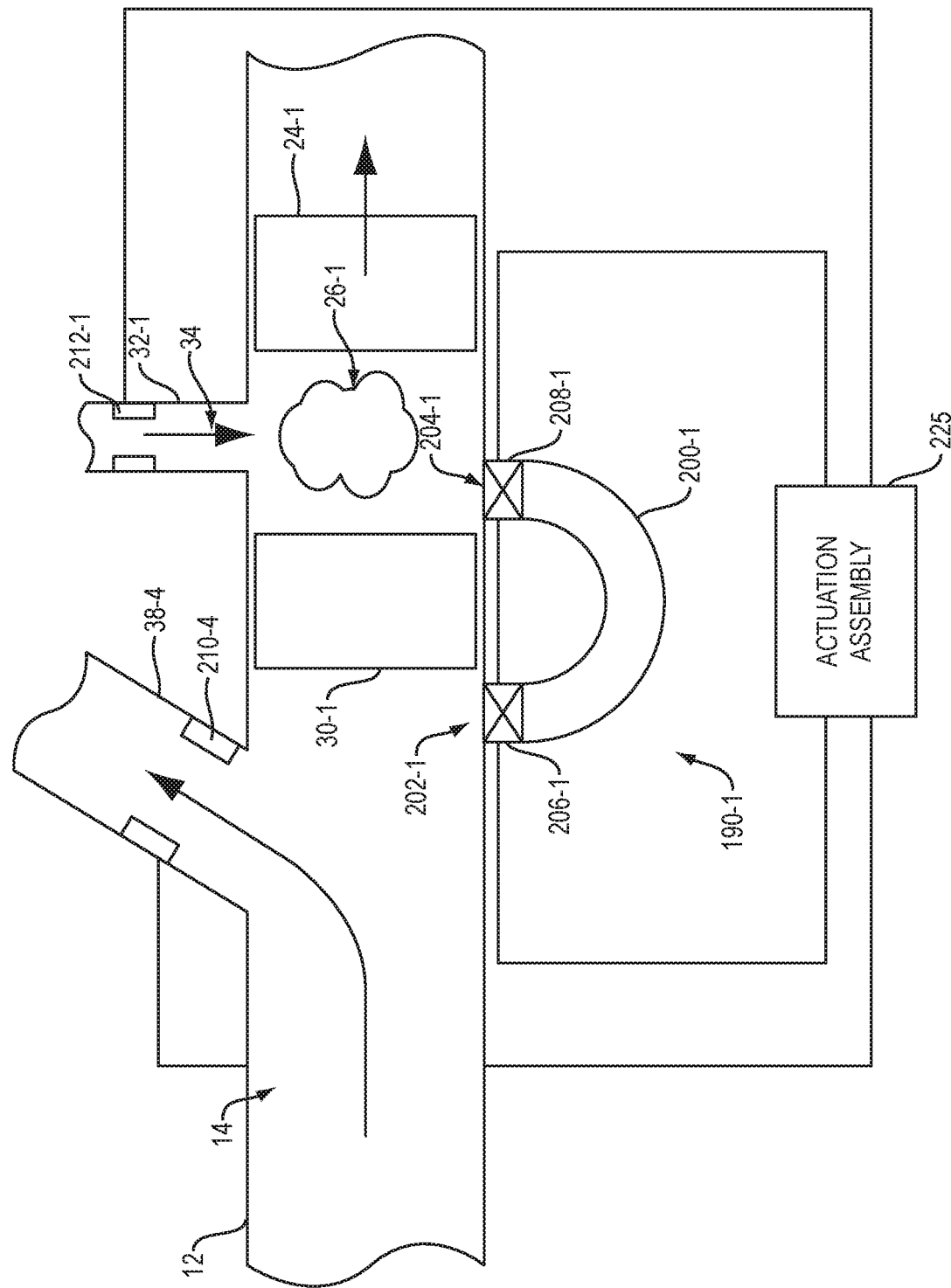
FIG. 3B illustrates a side sectional, schematic view of a portion of an annular bore of FIG. 3A and a bypass valve disposed in a first configuration, according to one arrangement.
Figure 4A:
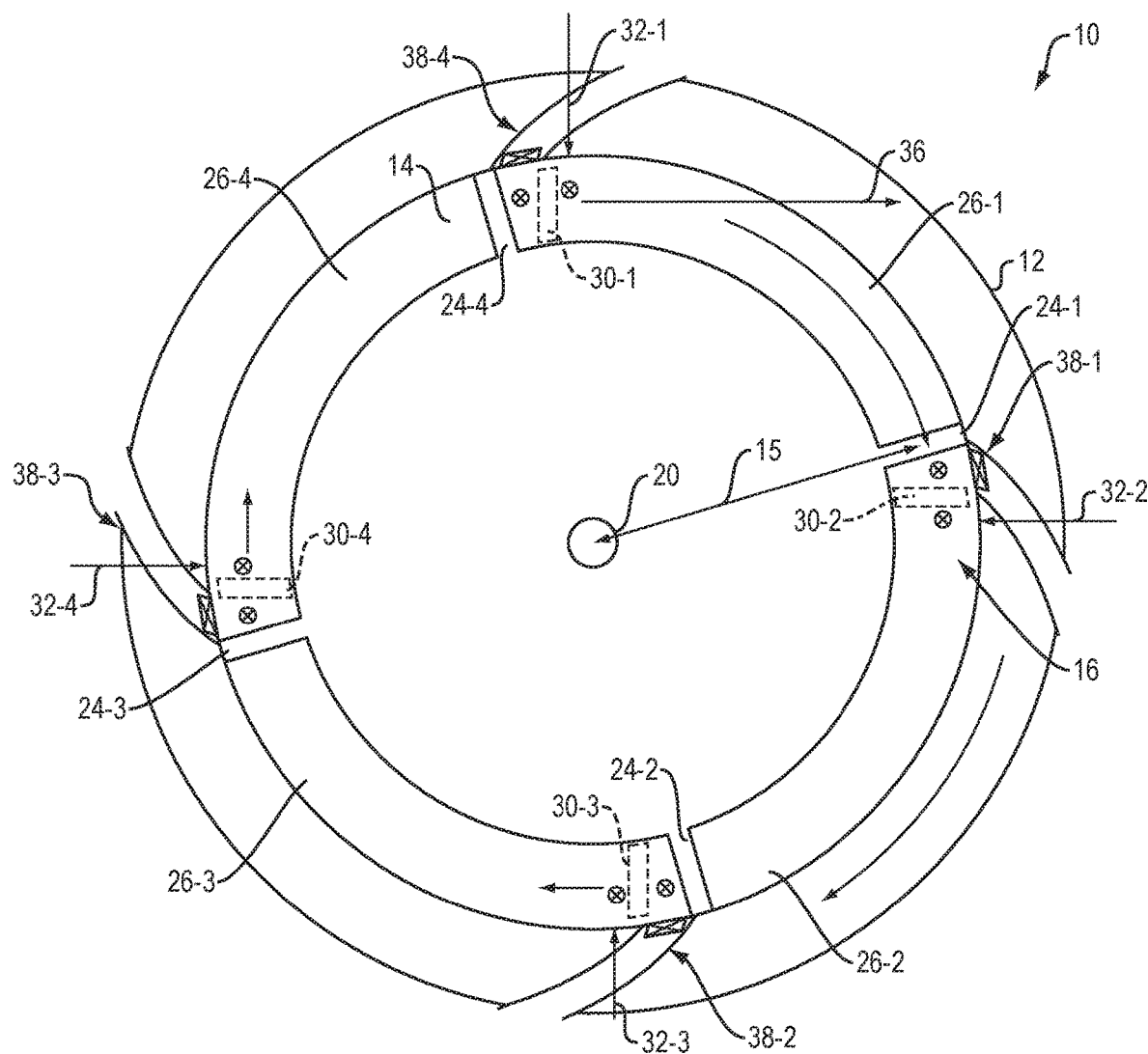
FIG. 4A illustrates a sectional, schematic view of a circulating piston engine of FIG. 3A having the set of bypass valves, according to one arrangement.
Figure 4B:
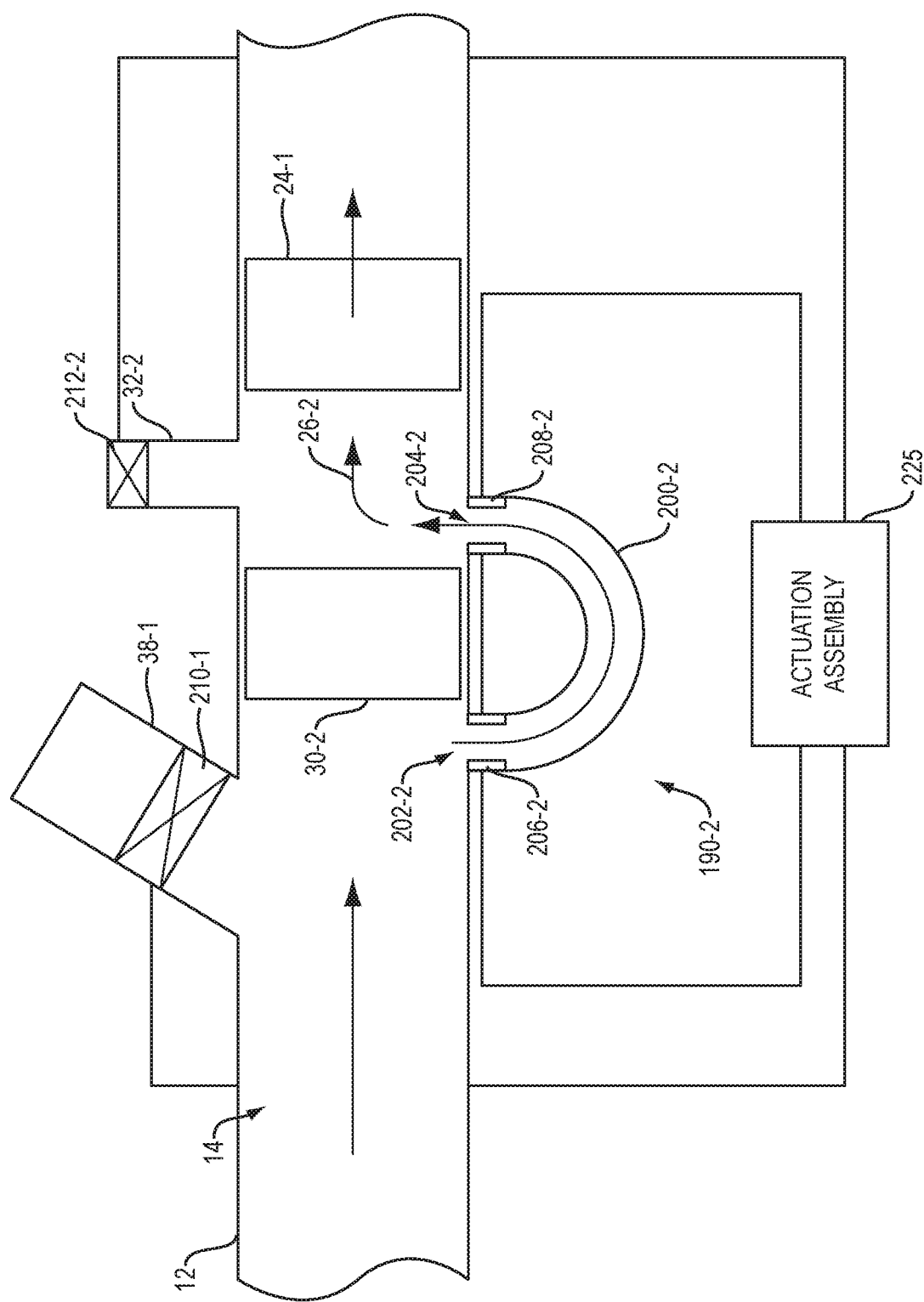
FIG. 4B illustrates a side sectional, schematic view of a portion of an annular bore of FIG. 4A and a bypass valve disposed in a second configuration, according to one arrangement.

Taking FIGS. 3A and 3B collectively, each bypass assembly 190 includes a first port 202 defined by the housing 12 and disposed on a first, proximal side of a rotary valve 30 and a second port 204 defined by the housing 12 and disposed on a second, distal side of the rotary valve 30. Each of the first and second ports 202, 204 include respective first and second port valves 206, 208 which are disposable between a first closed position, as shown in FIG. 3B, and a second open position, as shown in FIG. 4B. Further, the bypass assembly 190 includes a bypass channel 200 disposed in fluid communication with, and connecting, the first and second ports 202, 204.

Returning to FIGS. 3A and 3B, the bypass assembly 190 also includes an exhaust port valve 210 associated with each exhaust port 38 which is configured to be disposed between an open position, as shown in FIG. 3B, and a closed position, as shown in FIG. 4B. The bypass assembly 190 also includes a fuel injector valve 212 associated with each fuel injector 32 and which is configured to be disposed between an open position, as shown in FIG. 3B, and a closed position, as shown in FIG. 4B. In one arrangement, each of the valves 206, 208, 210, 212 can be actuated (e.g., opened or closed) either an electronic or manual valve actuation assembly 225.

The following provides a description of the operation of the bypass assembly 190 when the engine 10 is configured as a double stroke engine. For the sake of clarity, the operation of the bypass assemblies 190 associated with the first rotary valve 30-1 and the second rotary valve 30-2 will be described. It should be understood that the bypass assemblies 190 associated with the third rotary valve 30-3 and the fourth rotary valve 30-4 operate in a similar and substantially simultaneous manner as the bypass assemblies 190 associated with the first rotary valve 30-1 and the second rotary valve 30-2.

During operation, and with reference to FIGS. 3A and 3B, as the first rotary valve 30-1 forms a bulkhead relative to the first piston 24-1 and defines combustion chamber 26-1 there between, the valve actuation assembly 225 maintains the valves 206-1, 208-1 in a closed state. The valve actuation assembly 225 positions the exhaust valve 210-4 in an open state to allow exhaust from a proximal portion of the bore 14 to exit the engine 10. For example, the exhaust exits the exhaust valve 210-4 at a pressure of about 50 pounds per square inch (psi). Further, the valve actuation assembly 225 positions the fuel injector valve 212-1 in an open state to allow the fuel injector 32-1 to delivers a fuel-air mixture 34 into the associated combustion chamber 26-1 which can then be ignited by an ignition device (not shown) such as a spark plug. As the ignition devices ignite the fuel-air mixture 34 in the combustion chamber 26-1, the expansion of the fuel-air mixture 34 against the rotary valve 30-1 generates a force on the piston 24-1 to propel the piston 24-1 along the rotational travel path defined by the annular bore 14 and toward the second rotary valve 30-2, as illustrated in FIG. 4A.

With reference to FIG. 4B, after the piston 24-1 has passed the second valve location in the annular bore 14, the second rotary valve 30-2 forms a bulkhead relative to the first piston 24-1. However, because the engine 10 is configured as a double stroke engine, the fuel injector 32-2 is not configured to provide a fuel-air mixture into the combustion chamber 26-2 defined between the second rotary valve 30-2 and the first piston 24-1. In order to maintain the combustion gas pressure on the first piston 24-1 to drive the piston 24-1 toward the third rotary valve 30-3, the valve actuation assembly 225 positions the first and second valves 206-2, 208-2 in an open position and closes the exhaust port valve 210-1 and the fuel injector valve 212-2. With such a configuration, the relatively high pressure gas in the annular bore proximate to the rotary valve 30-2 flows through the bypass channel 200-2 and into the combustion chamber 26-2. Here the relatively high pressure gas from the combustion illustrated in FIG. 3B generates a load between the second rotary valve 30-2 and the piston 24-1 and forces the piston 24-1 to continue rotation toward the third rotary valve 30-3. Accordingly, the bypass assembly 190 allows the relatively high pressure gas to bypass the rotary valve 30-2 and to continue to drive the piston 24-1.

The use of the bypass assembly 190 with the engine 200 can, approximately, double the stroke of the piston 24 within the engine 10. For example, in the case where the engine bore 14 defines a stroke length engine of about sixteen inches between adjacent valves (e.g., between rotary valves 30-1 and 30-2 and between rotary valves 30-2 and 30-3) as illustrated in FIG. 1A, the use of the bypass assembly 190 increases the stroke length to about thirty-two inches between opposing valves (e.g., rotary valves 30-1 and 30-3). While the increased stroke length in the engine 10 can decrease the amount of power generated by the engine 10, the increased stroke length can increase the overall efficiency of the engine 10 for normal cruising operation. Further, any power loss can be partially and variably offset by increasing the volume of the fuel/air mixture delivered to a combustion chamber by a fuel injector 32.

Conventional four stroke engines perform a compression function within the cylinder in preparation for combustion. The engine draws air in from the atmosphere (e.g., at a pressure of about 14.7 pounds per square inch (psi)), premixed with fuel usually by a fuel injector, performs a compression cycle on the air to increase its pressure (e.g., to a pressure of about 150 psi), and delivers the compressed air-fuel mixture to the cylinder top for ignition by a spark plug.

Further, conventional crankshaft engines are configured to operate as compressors during a first engine rotation and a power generator during a second rotation. For example, a six-cylinder engine typically fires three cylinders during each revolution while the other three perform an air compression process. The cylinders reverse functions on the next revolution. However, such a configuration suffers from a variety of deficiencies. For example, the compression function is performed in a cylinder built for extreme pressures and temperatures. Conventional compressors do not typically experience or require the types of pressures developed in the engine. Accordingly, conventional engines require sufficient wall strength to withstand these pressures which makes the engine heavier than necessary for air compression. Additionally, during operation, compressed air is drawn into a cylinder with residual exhaust, which is not typically cleared and which can impair the combustion process. Compression capacity is limited by the combustion volume and the circuitous route the incoming air must take. Accordingly, at high RPMs, conventional engines utilize turbo and superchargers to provide adequate air volume thereto. These components can add to the weight, complexity, and cost of the engine.

In one arrangement, in order to separate the compression process from the combustion process, the engine 10 is configured with an air compression assembly. The air compression assembly includes a compression channel which can be machined or formed from a relatively light weight material. In addition, the volume of the compression channel can be larger than the volume of a corresponding combustion channel. Such a difference in volume increases the air capacity of the air compression assembly relative to the combustion assembly, thereby minimizing or eliminating the need for supplemental devices. In the absence of a crankshaft, connecting rods, balance weights, cam shafts, etc., this engine having an integrated-air compression assembly can be 50% lighter than conventional crankshaft based engines and produces power close to 100% of the time.

Figure 5:
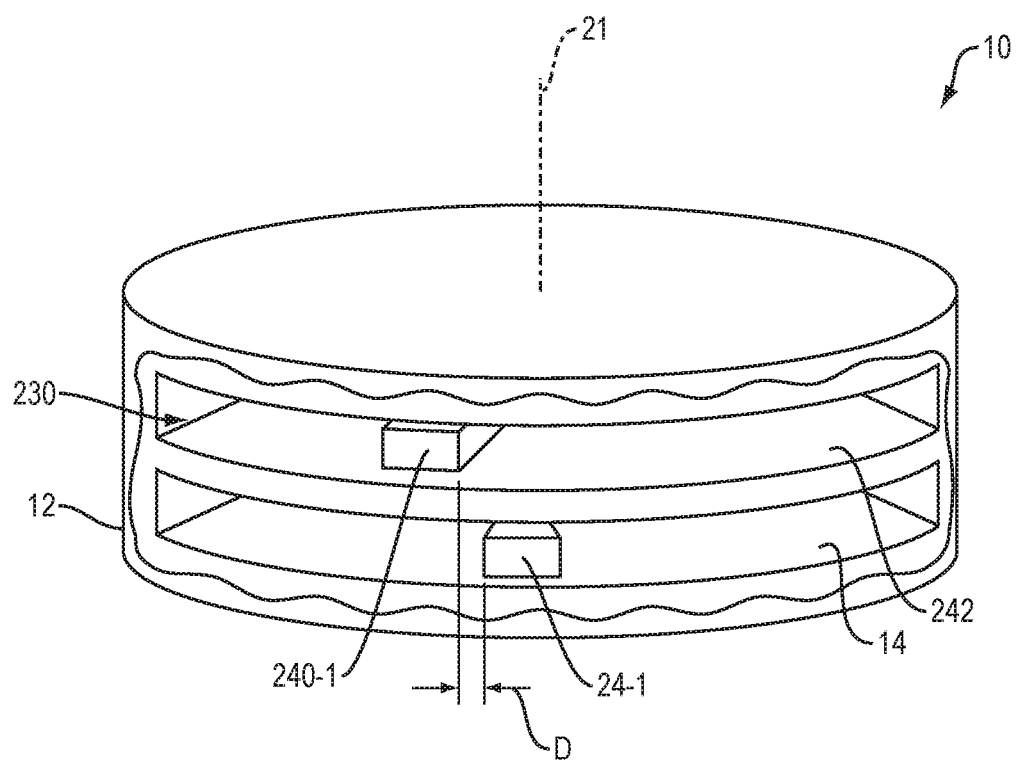
FIG. 5 illustrates a partial sectional, schematic side view of a circulating piston engine having a combustion channel and an air compression channel, according to one arrangement.

For example, FIG. 5 illustrates a partial sectional, schematic side view of a circulating piston engine 10 having the air compression assembly 230. The air compression assembly 230 is configured as a source of compressed air for the engine 10 which can be delivered to the fuel injectors 32, as shown in FIG. 3B, during operation.

For example, the air compression assembly 230 includes an annular compression channel 242 defined by the housing 12. As illustrated, the compression channel 242 is disposed axially above, and substantially parallel to, the combustion channel (i.e., annular bore) 14 along the axis of rotation 21. The air compression assembly 230 includes a set of compression pistons 240 coupled to the flywheel 22 and disposed within the annular compression channel 242.

The flywheel 22 is configured to rotate both sets of compression pistons 240 and combustion pistons 24 within the respective channels 242, 14. Accordingly, during operation, both sets of pistons 24, 240 rotate at the same rate. As illustrated, each compression piston 240 is disposed at an offset distance D proximal to each respective piston 24. As will be described below, the offset distance allows a single rotary valve 30 having a single opening 100 to serve as the rotary valve for both channels 14, 242.

During operation, the air compression assembly 230 is configured to generate and provide compressed air to the engine's fuel injectors 10. FIGS. 6A through 6D illustrate an example of the operation of the air combustion and compression processes in channels 14, 240 that are substantially concentrically aligned along an axis of rotation 21 of the flywheel 22.

Figure 6A:
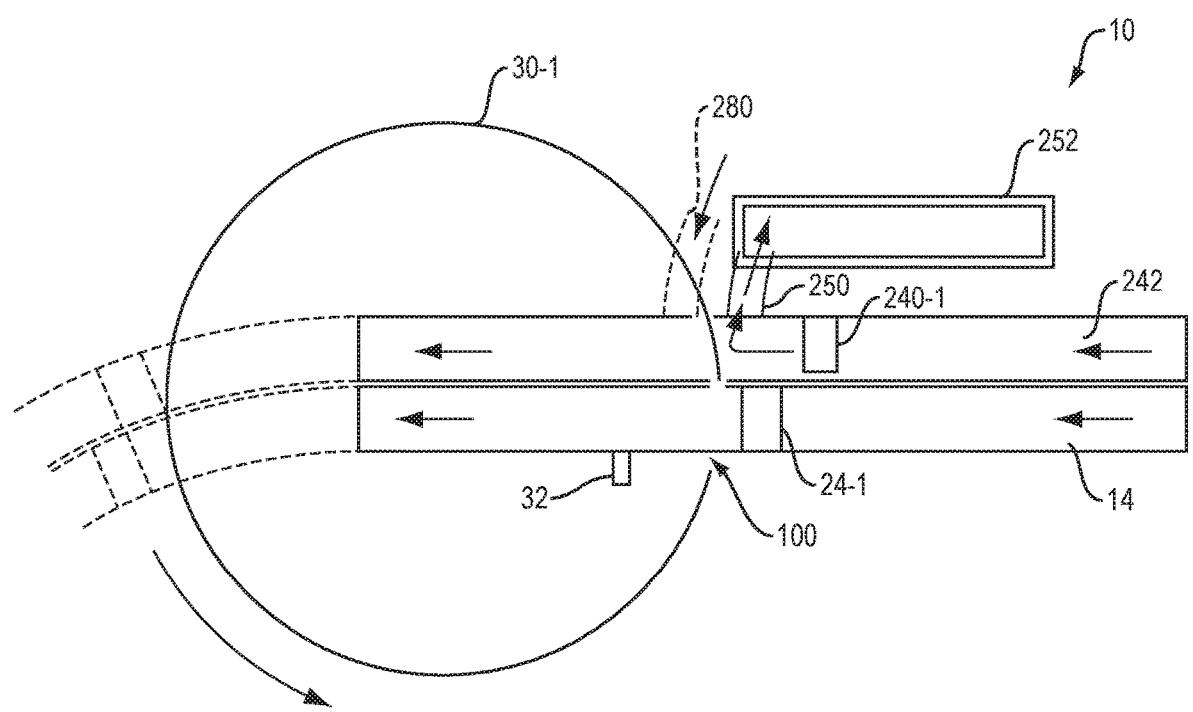
FIG. 6A illustrates a side sectional, schematic view of a circulating piston engine having an air compression piston and a combustion piston of FIG. 5 disposed in a first position relative to the air compression channel and the combustion channel, respectively.

FIG. 6A illustrates an example of the operation of a single rotary valve 30-1 of the engine 10 with respect to the combustion channel 14 and compression channel 242. During operation, the combustion piston 24-1 and the compression piston 240-1 rotate in their respective channels 14, 242 while the rotary drive mechanism 60 rotates a rotary valve 30-1 to a first position relative to the combustion and compression channels 14, 242. With such positioning, the opening 100 of the rotary valve 30-1 is aligned within the combustion channel 14 such that the combustion piston 24-1 can rotate past the rotary valve 30-1. Also with such positioning, a portion of the rotary valve 30-1 is disposed within the compression channel 242 to form a bulkhead relative to the compression piston 240-1. As the piston 240-1 rotates toward the rotary valve 30-1, the piston 240-1 compresses the air contained within the compression channel 242 between the piston 240-1 and the rotary valve 30-1 to a pressure of about 176 psi. The compressed air is delivered, via an outlet port 250, to a pressurized air reservoir 252 which is disposed in fluid communication with the compression channel 242. The pressurized air reservoir 252 maintains the pressurized air at a pressure of about 176 psi and delivers the compressed air to a fuel injector 32.

Figure 6B:
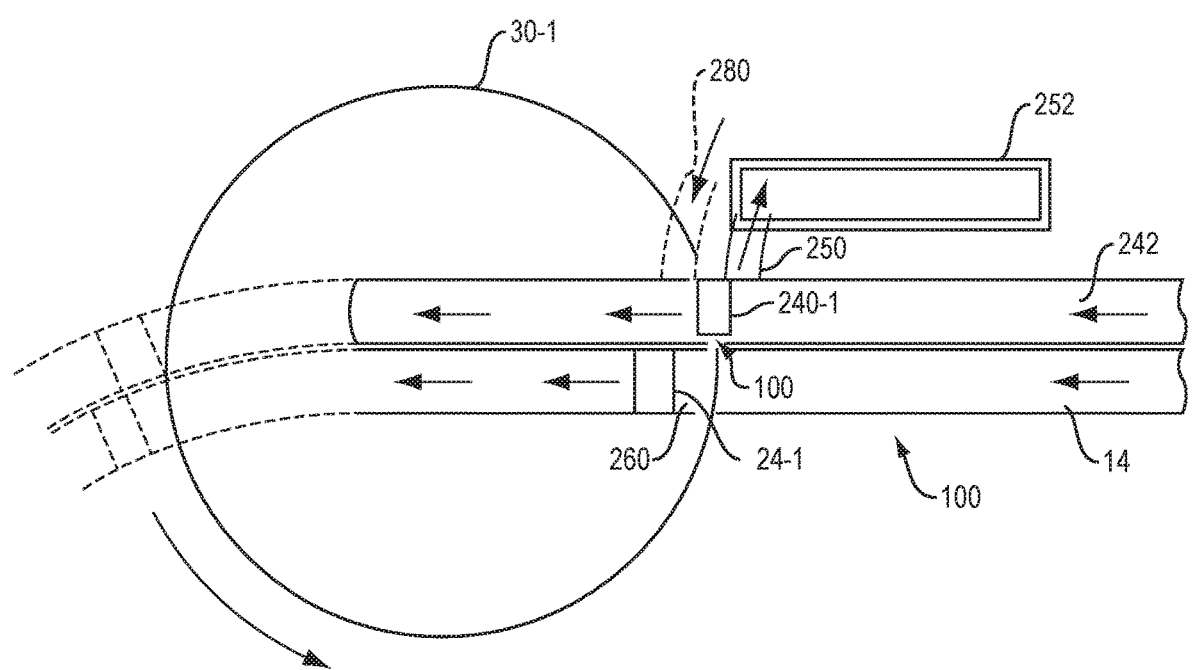
FIG. 6B illustrates a side sectional, schematic view of the circulating piston engine having the air compression piston and the combustion piston of FIG. 6A disposed in a second position relative to the air compression channel and the combustion channel, respectively.

As shown in FIG. 6B, as the rotary valve 30-1 continues to rotate via the rotary drive mechanism 60, the valve 30-1 is disposed in a second position relative to the combustion and compression channels 14, 242. In this position, the opening 100 becomes aligned with the compression channel 242 which allows the compression piston 240-1 to continue to rotate within the compression channel 242 past the rotary valve 30-1. Further, with the combustion piston 24-1 having traveled past the rotary valve 30-1, the combustion piston 24-1 defines a combustion chamber 260 relative to the rotary valve 30-1.

Figure 6C:
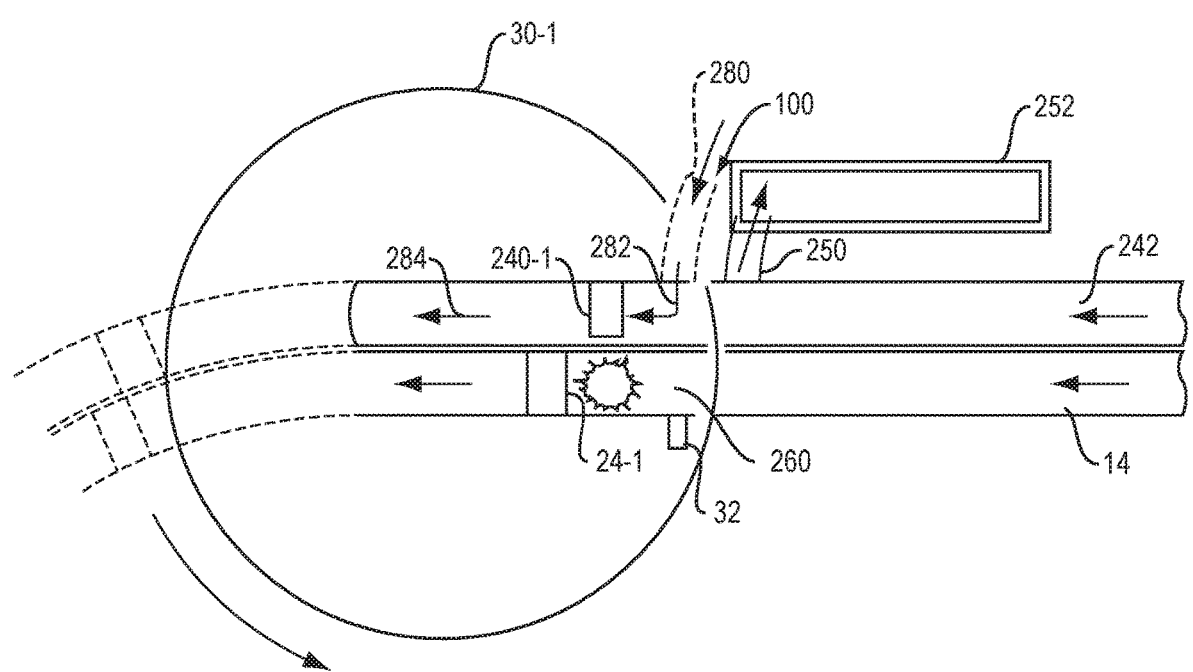
FIG. 6C illustrates a side sectional, schematic view of the circulating piston engine having the air compression piston and the combustion piston of FIGS. 6A and 6B disposed within the air compression channel and the combustion channel, respectively.

As shown in FIG. 6C, continued rotation of the rotary valve 30-1 by the rotary drive mechanism 60 disposes the valve 30-1 in a third position relative to the combustion and compression channels 14, 242. With such positioning, a portion of the rotary valve 30-1 is disposed within the combustion channel 14 to define the combustion chamber 260. Combustion of a fuel-air mixture provided by the fuel injector 32 within the combustion channel 260 drives further rotation of the combustion piston 24-1 within combustion channel 14. Also with such positioning of the rotary valve 30-1, the opening 100 in the rotary valve 30-1 is aligned with an inlet port 280 while a portion of the rotary valve 30-1 is disposed within the compression channel 242. As the compression piston 240-1 travels in the compression channel 242, the rotary valve 30-1 acts as a bulkhead relative to the piston 240-1 such that the piston 240-1 draws air 282 into a rearward portion of compression channel 242 via the inlet port 280. Further, rotation of the piston 240-1 compresses the air 284 in a forward portion against an adjacently disposed, and closed, rotary valve 30-2.

As indicated above, the compression channel 242 is disposed in a top-to-bottom relationship relative to the annular bore or fuel combustion channel 14. Such description is by way of example only. In one arrangement, the compression channel 242 can be disposed in a side-by-side manner relative to the annular bore or fuel combustion channel 14.

Figure 7:
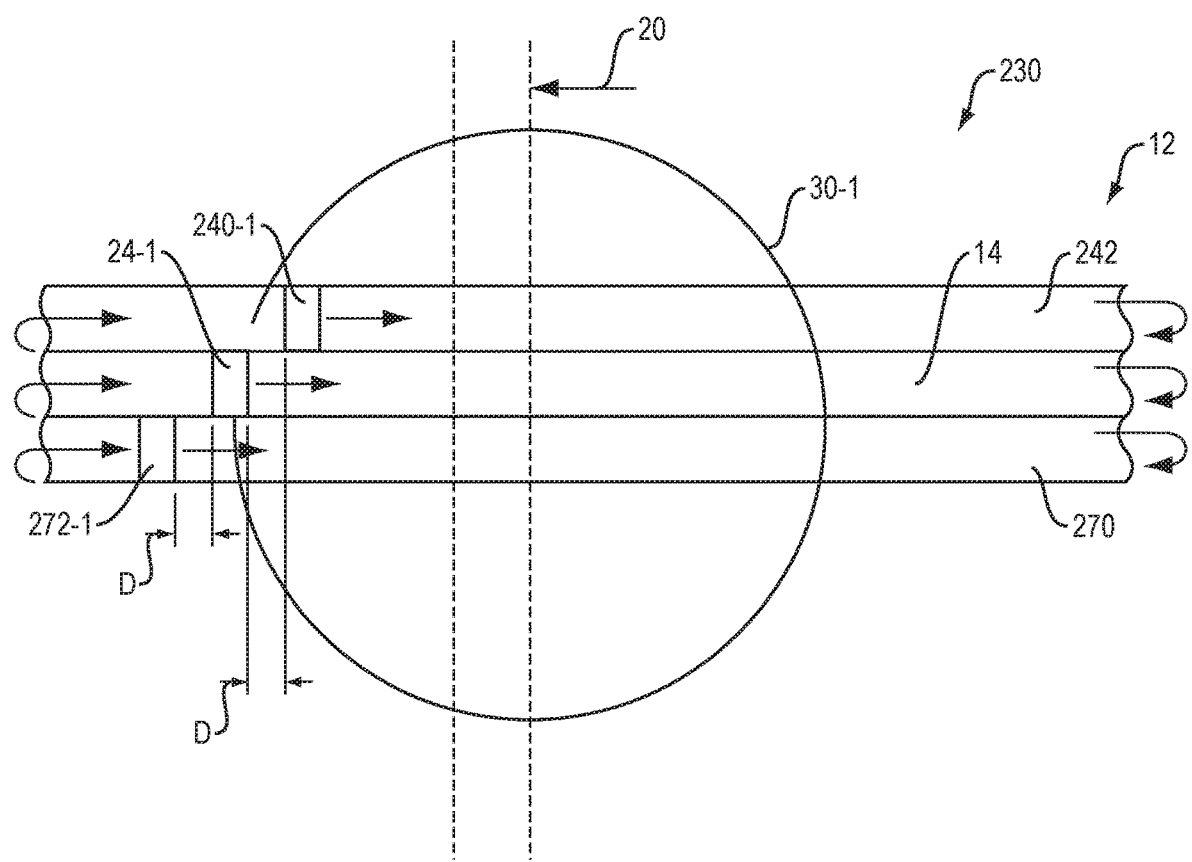
FIG. 7 illustrates a side sectional, schematic view of a circulating piston engine having a first and second air compression channel, combustion channel, and rotary valve, according to one arrangement.

FIG. 7 illustrates another arrangement of the air compression assembly 230. As indicated, the engine housing 12 defines a second annular compression channel 270 disposed axially below, and substantially parallel to, the annular bore 14 (e.g., combustion channel) defined by the engine 10. The air compression assembly 230 also includes a set of compression pistons 227 coupled to the flywheel 22 and disposed within the second annular compression channel 270. The flywheel 22 is configured to rotate both sets of compression pistons 240, 272 within respective channels 242, 270 and the combustion pistons 24 within the channel 14. Accordingly, during operation, all sets of pistons 24, 240, 270 rotate at the same rate. As illustrated, each compression piston 240 is disposed at an offset distance D proximal to each respective piston 24. The offset distance D allows a single rotary valve 30 having a single opening 100 to serve as the rotary valve for all channels 14, 242, 270.

With the inclusion of two compression channels 242, 270 as part of the air compression assembly 230, the air compression assembly 230 can generate a relatively large volume of air for engine operation. Further, with two compression channels 242, 270 disposed above and below the combustion channel 14, the compression channels 242, 270 can reduce the temperature of the compression channel 14 during operation (e.g., during the occurrence of combustion events).

While various embodiments of the innovation have been particularly shown and described, it will be understood by those skilled in the art that various changes in form and details may be made therein without departing from the spirit and scope of the innovation as defined by the appended claims.

As illustrated in FIGS. 1B, 2A, and 2B, the rotary valve 30 is shown as having a substantially rectangular cross-section. Further, the opposing openings 104, 106 defined by the housing 12 are illustrated as having a rectangular configuration. Such illustration is by way of example only. In one arrangement, the rotary valve 30 is configured as having a substantially circular cross-section and each of the corresponding openings 104, 106 are configured with a substantially circular geometry which corresponds to the circular cross-sectional geometry of the rotary valve. With such a geometry, the rotary valve 30 and corresponding openings 104, 106 are configured to provide ease of sealing there between. Further, the substantially circular cross-section of the rotary valve 30 aids in minimizing internal stresses within the rotary valve 30 during operation and allows for interaction with the driving mechanism.

Figure 6D:
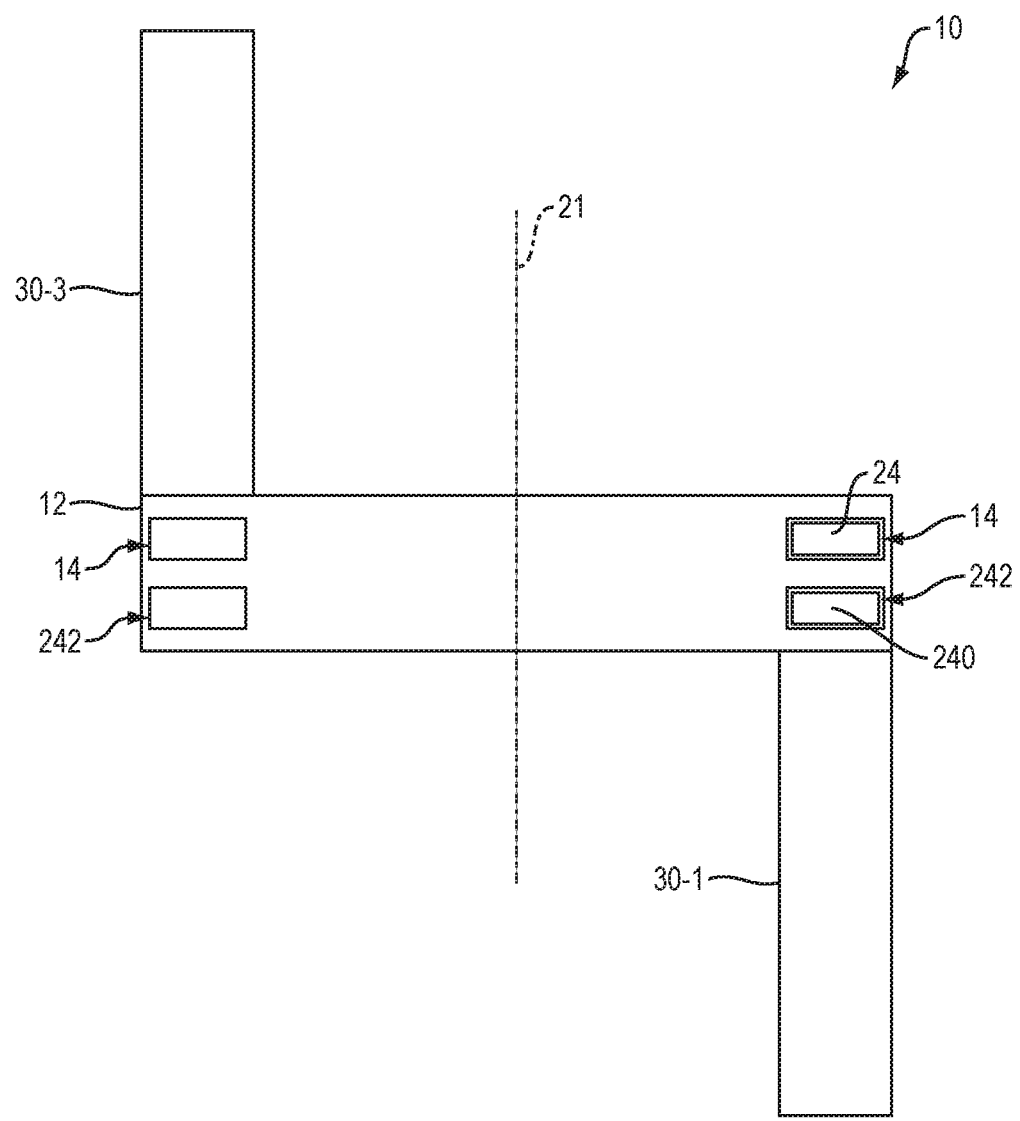
FIG. 6D illustrates a side sectional, schematic view of the circulating piston engine having the air compression channel, combustion channel, and rotary valve, according to one arrangement.

As indicated above, with reference to FIGS. 5-6D, an air compression assembly 230 can be integrated with an engine 10 having a separate combustion assembly. Such description is by way of example only. In one arrangement, the air compression assembly 230 can be configured as part of a stand-alone device, without a combustion assembly.

As indicated above, the engine 10 can be configured as a double stroke engine where two of the four pistons 24 (e.g., piston 24-1 and 24-3) experience two combustion events in a single revolution. With such a configuration, to extend the drive provided on the pistons 24 by the pressurized combustion gas within the annular bore 14, the engine 10 is configured with a set of bypass assemblies 190 which operate in conjunction with the rotary valves 30 described above. Such description is by way of example only. In one arrangement, the bypass assemblies 190 can be utilized with any valve assembly that is moveably disposed within the annular bore 14 of the engine 10 to create a temporary combustion chamber 26 relative to a corresponding piston 24. For example, the valve assembly can include a valve configured to pivot between a first, open position and a second, closed position utilizing a synchronous actuation mechanism to limit or prevent mechanical contact between the circulating piston and the valve during operation, as described in pending U.S. application Ser. No. 14/143,995, filed on Dec. 30, 2013, entitled, "Circulating Piston Engine," the contents and teachings of which are hereby incorporated by reference in their entirety.

What is claimed is:
1. An engine, comprising:
a housing defining:
an annular combustion channel disposed at an outer periphery of the housing, and
an annular compression channel disposed at an outer periphery of the housing and disposed at an axial location relative to the annular combustion chamber;
a set of combustion pistons disposed within the combustion channel;

a set of compression pistons disposed within the compression channel;

a set of rotary valves, each rotary valve of the set of rotary valves disposed within both the combustion channel and the compression channel; and a drive mechanism connected to the set of rotary valves and configured to position each rotary valve of the set of rotary valves:

between a first position to align each rotary valve in the combustion channel to allow a combustion piston of the set of combustion pistons to travel within the combustion channel from a first location to a second location relative to each respective rotary valve of the set of rotary valves and a second position to define a combustion chamber relative to the combustion piston at the second location, and between a first position to align each rotary valve in the compression channel to allow a compression piston of the set of compression pistons to travel within the compression channel from a first location to a second location relative to each respective rotary valve of the set of rotary valves and a second position to define a compression chamber relative to the compression piston at the second location.

2. The engine of claim 1, wherein the annular compression channel is disposed at an axial location that is axially above the annular combustion chamber defined by the housing.

3. The engine of claim 2, wherein each compression piston of the set of compression pistons is disposed within the compression channel at an offset distance relative to a corresponding combustion piston of the set of combustion pistons disposed within the combustion channel.

4. The engine of claim 1, wherein the housing defines, as the annular compression channel, a first annular compression channel and a second annular compression channel, the first annular compression channel disposed axially above the annular combustion channel defined by the housing and the second annular compression channel disposed axially below the annular combustion channel defined by the housing.

5. The engine of claim 1, further comprising a pressurized air reservoir disposed in fluid communication with the annular compression channel, the pressurized air reservoir configured to receive compressed air from the annular compression channel.

6. The engine of claim 5, wherein the pressurized air reservoir disposed in fluid communication with a fuel injector, the pressurized air reservoir configured to deliver pressurized air to the fuel injector.

7. The engine of claim 1, wherein the engine further comprises a bypass assembly comprising:

a first port disposed on a first side of at least one of the rotary valves of the set of rotary valves, the first port having a first port valve;

a second port disposed on a second side of at least one of the rotary valves of the set of rotary valves, the second port having a second port valve;

a bypass channel disposed in fluid communication with the first port and the second port; and a valve actuation assembly disposed in operative communication with the first port valve and the second port valve, the valve actuation assembly configured to dispose each of the first port valve and the second port valve between an open position and a closed position.

8. The engine of claim 1, wherein each rotary valve comprises a circular faceplate and a wall structure disposed at an outer periphery of the faceplate, a portion of each rotary valve disposed within the annular combustion channel and the annular compression channel such that the axis of rotation of the wall structure is substantially perpendicular to an axis of rotation of the set of combustion pistons and the set of compression pistons.

9. The engine of claim 1, wherein the annular compression channel is disposed at an axial location that is axially below the annular combustion chamber defined by the housing.

10. An engine, comprising:

a housing defining an annular bore;

a piston assembly disposed within the annular bore; and a set of rotary valves, a portion of each rotary valve of the set of rotary valves disposed within the annular bore;

wherein the annular bore comprises an annular combustion channel disposed at an outer periphery of the housing and an annular compression channel disposed at an outer periphery of the housing disposed at an axial location relative to the annular combustion chamber, wherein the piston assembly comprises a set of combustion pistons disposed within the combustion channel and a set of compression pistons disposed within the compression channel, and wherein the portion of each rotary valve of the set of rotary valves disposed within the annular bore is within both the combustion channel and the compression channel.

11. The engine of claim 10, wherein each rotary valve comprises a circular faceplate and a wall structure disposed at an outer periphery of the faceplate, a portion of each rotary valve disposed within the annular bore such that the axis of rotation of the wall structure is substantially perpendicular to an axis of rotation of a piston of the piston assembly.

12. The engine of claim 11, comprising a rotary drive mechanism connected to each rotary valve and configured to rotate each rotary valve between a first position to align an opening of the wall structure with the annular bore to allow the piston of the piston assembly to travel within the annular bore from a first location relative to each respective rotary valve to a second location relative to each respective rotary valve and a second position to define a chamber relative to the piston of the piston assembly at the second location.

* * * * *